(12) United States Patent
Barbu et al.

(10) Patent No.: US 12,484,014 B2
(45) Date of Patent: Nov. 25, 2025

(54) POSITIONING USING A LINE-OF-SIGHT SIGNAL

(71) Applicant: NOKIA TECHNOLOGIES OY, Espoo (FI)

(72) Inventors: Oana-Elena Barbu, Aalborg (DK); Nuno Manuel Kiilerich Pratas, Gistrup (DK); Benny Vejlgaard, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 356 days.

(21) Appl. No.: 18/054,673

(22) Filed: Nov. 11, 2022

(65) Prior Publication Data

US 2023/0164737 A1    May 25, 2023

(30) Foreign Application Priority Data

Nov. 19, 2021   (EP) .................................. 21209413

(51) Int. Cl.
    *H04W 64/00*      (2009.01)
    *G01S 5/02*      (2010.01)

(52) U.S. Cl.
    CPC ......... *H04W 64/003* (2013.01); *G01S 5/0273* (2013.01)

(58) Field of Classification Search
CPC . H04W 64/00; H04W 64/003; H04W 72/046; G01S 5/0273; G01S 5/0218; G01S 5/0221; H04L 25/0204; H04L 25/0212; H04B 7/0408
See application file for complete search history.

(56) References Cited

U.S. PATENT DOCUMENTS

| | | | |
|---|---|---|---|
| 10,327,106 B2 | 6/2019 | Hwang et al. | |
| 10,720,978 B1 | 7/2020 | Sun et al. | |
| 2017/0093475 A1 | 3/2017 | Smith et al. | |
| 2019/0081688 A1 | 3/2019 | Deenoo et al. | |
| 2020/0088869 A1* | 3/2020 | Pefkianakis | H04W 64/006 |
| 2021/0321221 A1* | 10/2021 | Yerramalli | G01S 5/0278 |
| 2022/0373635 A1* | 11/2022 | Bao | H04W 64/00 |
| 2023/0288517 A1* | 9/2023 | Walk | G01S 5/0218 |
| 2024/0267108 A1* | 8/2024 | Xu | H04B 17/10 |

FOREIGN PATENT DOCUMENTS

EP      3860006 A1 *   8/2021      H04L 45/12

OTHER PUBLICATIONS

Extended European Search Report for European Application No. 21209413.0 dated May 10, 2022, 8 pages.

(Continued)

*Primary Examiner* — Siu M Lee
(74) *Attorney, Agent, or Firm* — ALSTON & BIRD LLP

(57) ABSTRACT

A method, apparatus and computer readable medium are provided for determining position information of a receiver device. The method includes determining a plurality of beams and combining received multipath signals from the plurality of the beams. The received multipath signals are generated by a transmitter device. The method also includes determining, based at least in part on the combined received multipath signals, a line of sight signal and determining, based at least in part on the line of sight signal, position information of a receiver device.

16 Claims, 5 Drawing Sheets

(56) References Cited

OTHER PUBLICATIONS

Jiang et al., "An UWB Channel Impulse Response De-Noising Method for NLOS/LOS Classification Boosting", IEEE Communications Letters, vol. 24, Issue 11, (Jul. 16, 2020), 5 Pages.
Khalilsarai et al., "WiFi-Based Channel Impulse Response Estimation and Localization via Multi-Band Splicing", GLOBECOM 2020—2020 IEEE Global Communications Conference, (Feb. 15, 2021), 6 pages.
Matolak et al., "Peer-to-Peer Urban Channel Characteristics for Two Public-Safety Frequency Bands", IEEE Antennas and Propagation Magazine, vol. 56, No. 5, (Oct. 2014), 15 pages.
Nazir et al., "Classification of Localization Algorithms for Wireless Sensor Network: A Survey", 2012 International Conference on Open Source Systems and Technologies (ICOSST-2012), (Aug. 2012), 5 pages.
Suroso et al., "Spatial Aliasing Effects on Beamforming Performance in Large-Spacing Antenna Array", Communications in Science and Technology, vol. 4, No. 1, (May 20, 2019), 6 pages.

\* cited by examiner

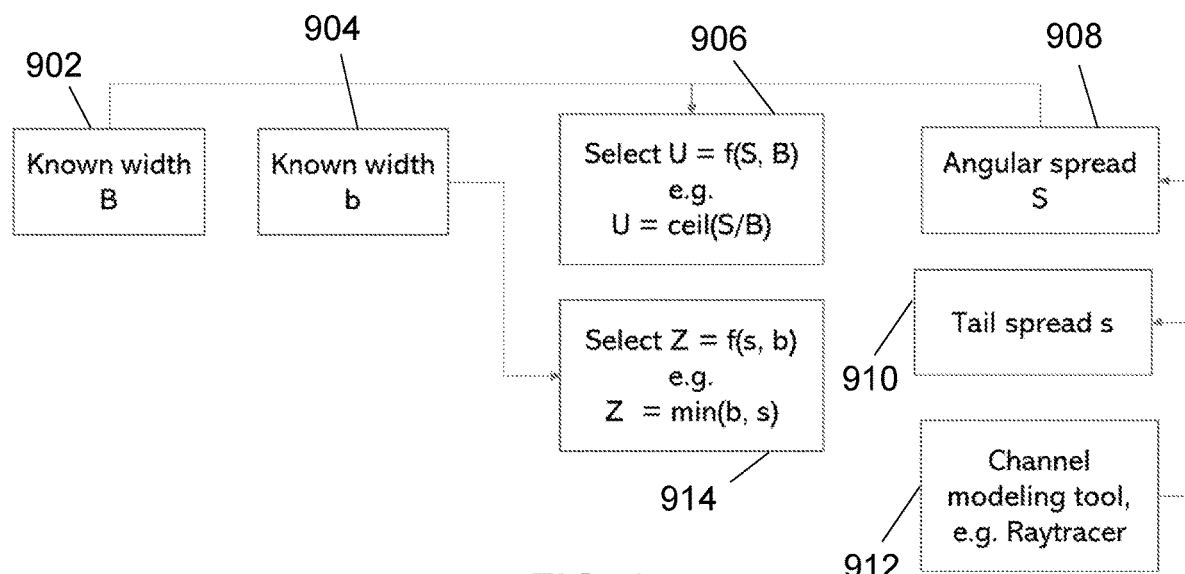
FIG. 9
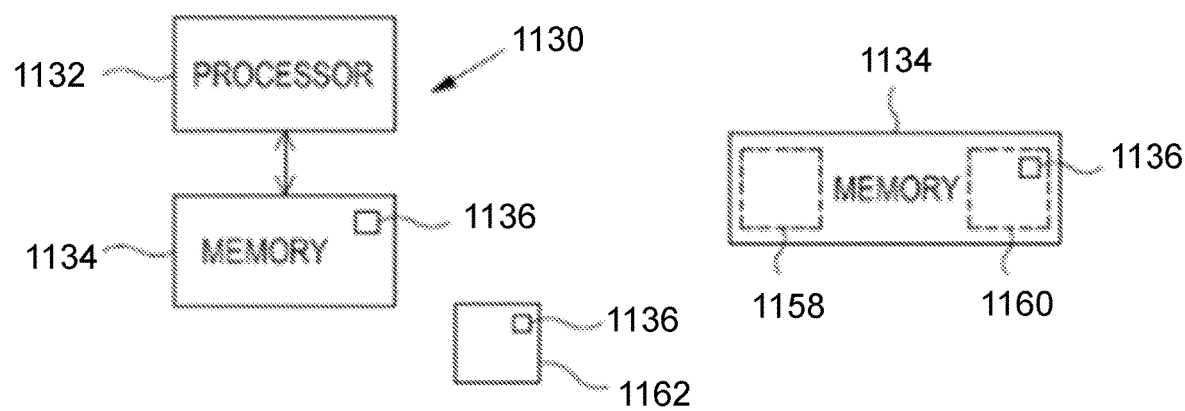
FIG. 10A
FIG. 10B

POSITIONING USING A LINE-OF-SIGHT SIGNAL

CROSS-REFERENCE TO RELATED APPLICATIONS

This application claims priority to European Patent Application No. 21209413.0, filed Nov. 19, 2021, the entire contents of which are incorporated herein by reference.

TECHNOLOGICAL FIELD

Embodiments of the present disclosure relate to positioning. Some relate to positioning in a wireless network.

BACKGROUND

A wireless network comprises a plurality of network nodes including terminal nodes and access nodes. Communication between the terminal nodes and the access nodes is wireless.

In some circumstances, it may be desirable to modify or enhance how a receiver device determines position information.

BRIEF SUMMARY

According to various, but not necessarily all, embodiments there is provided an apparatus comprising:
    means for determining a plurality of beams;
    means for combining received multipath signals from the plurality of the beams, the received multipath signals generated by a transmitter device;
    means for determining, based at least in part on the combined received multipath signals, a line of sight signal; and
    means for determining, based at least in part on the line of sight signal, position information of a receiver device.

In some examples, combining the received multipath signals from the plurality of the beams comprises determining a superimposed channel response for the plurality of beams.

In some examples, determining a line of sight signal comprises assuming that delays associated with the received multipath signals are on a grid having a resolution.

In some examples, the resolution is less than the sampling time.

In some examples, determining a line of sight signal comprises determining a first received multipath signal having energy above a threshold.

In some examples, determining a line of sight signal comprises employing a non-line-of-sight channel detector.

In some examples, the means are configured to:
    determine a number of beams from which the received multipath signals are to be combined.

In some examples, determining a number of beams is based, at least in part, on one or more of:
    a beam width of a main beam lobe and first side lobes;
    the channel spread in the angle domain for multipath signals above a power threshold;
    the channel spread in the angle domain for multipath signals below the power threshold.

According to various, but not necessarily all, embodiments there is provided an electronic device comprising an apparatus as described herein and a plurality of antennas.

According to various, but not necessarily all, embodiments there is provided a method comprising:
    determining a plurality of beams;
    combining received multipath signals from the plurality of the beams, the received multipath signals generated by a transmitter device;
    determining, based at least in part on the combined received multipath signals, a line of sight signal; and
    determining, based at least in part on the line of sight signal, position information of a receiver device.

In some examples, combining the received multipath signals from the plurality of the beams comprises determining a superimposed channel response for the plurality of beams.

In some examples, determining a line of sight signal comprises assuming that delays associated with the received multipath signals are on a grid having a resolution.

In some examples, the resolution is less than the sampling time.

In some examples, determining a line of sight signal comprises determining a first received multipath signal having energy above a threshold.

In some examples, determining a line of sight signal comprises employing a non-line-of-sight channel detector.

In some examples, the method comprises:
    determining a number of beams from which the received multipath signals are to be combined.

In some examples, determining a number of beams is based, at least in part, on one or more of:
    a beam width of a main beam lobe and first side lobes;
    the channel spread in the angle domain for multipath signals above a power threshold;
    the channel spread in the angle domain for multipath signals below the power threshold.

According to various, but not necessarily all, embodiments there is provided a computer program comprising instructions for causing an apparatus to perform:
    determining a plurality of beams;
    combining received multipath signals from the plurality of the beams, the received multipath signals generated by a transmitter device;
    determining, based at least in part on the combined received multipath signals, a line of sight signal; and
    determining, based at least in part on the line of sight signal, position information of a receiver device.

In some examples, combining the received multipath signals from the plurality of the beams comprises determining a superimposed channel response for the plurality of the beams.

In some examples, determining a line of sight signal comprises assuming that delays associated with the received multipath signals are on a grid having a resolution.

In some examples, the resolution is less than the sampling time.

In some examples, determining a line of sight signal comprises determining a first received multipath signal having energy above a threshold.

In some examples, determining a line of sight signal comprises employing a non-line-of-sight channel detector.

In some examples, the computer program comprising instructions for causing an apparatus to perform:
    determining a number of beams from which the received multipath signals are to be combined.

In some examples, determining a number of beams is based, at least in part, on one or more of:
- a beam width of a main beam lobe and first side lobes;
- the channel spread in the angle domain for multipath signals above a power threshold;
- the channel spread in the angle domain for multipath signals below the power threshold.

According to various, but not necessarily all, embodiments there is provided an apparatus comprising
- at least one processor; and
- at least one memory including computer program code;
- the at least one memory and the computer program code configured to, with the at least on processor, cause the apparatus at least to perform at least a part of one or more methods disclosed herein.

According to various, but not necessarily all, embodiments there is provided an apparatus comprising means for performing at least part of one or more methods disclosed herein.

According to various, but not necessarily all, embodiments there is provided examples as claimed in the appended claims.

The description of a function should additionally be considered to also disclose any means suitable for performing that function

BRIEF DESCRIPTION

Some examples will now be described with reference to the accompanying drawings in which:

FIG. 9 shows another example of the subject matter described herein;

FIG. 10A shows another example of the subject matter described herein; and

FIG. 10B shows another example of the subject matter described herein.

DETAILED DESCRIPTION

Figure 1:
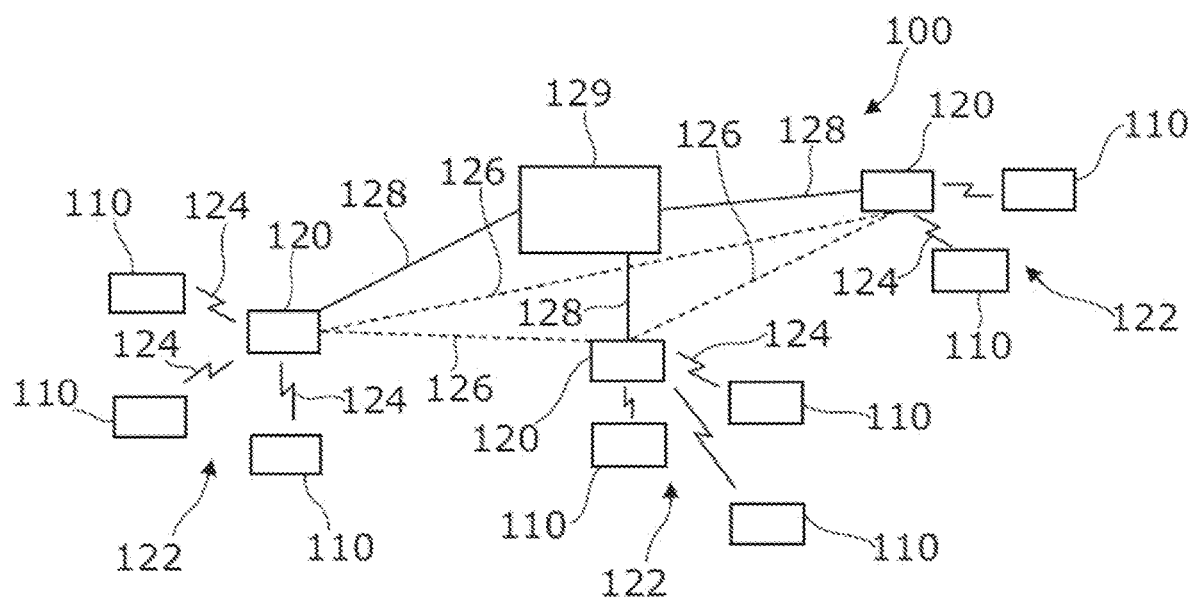
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a telecommunications network, in which at least some of the terminal nodes 110 and access nodes 120 communicate with each other using transmission/reception of radio waves/signals.

The one or more core nodes 129 may, in some examples, communicate with each other. The one or more access nodes 120 may, in some examples, communicate with each other.

The one or more terminal nodes 110 may, in some examples, communicate with each other.

The network 100 may be a cellular network comprising a plurality of cells 122 at least one served by an access node 120. In this example, the interface between the terminal nodes 110 and an access node 120 defining a cell 122 is a wireless interface 124.

The access node(s) 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations (for example, gNBs).

Functionality of a base station may be distributed between a central unit (CU), for example a gNB-CU, and one or more distributed units (DU), for example gNB-DUs.

In the particular example illustrated the network 100 is an Evolved Universal Terrestrial Radio Access network (E-UTRAN). The E-UTRAN comprises E-UTRAN NodeBs (eNBs), providing the E-UTRA user plane and control plane (for example, RRC) protocol terminations towards the UE. The eNBs 120 are interconnected with each other by means of an X2 interface 126. The eNBs are also connected by means of the S1 interface 128 to the Mobility Management Entity (MME) 129.

In other examples the network 100 is a Next Generation (or New Radio, NR) Radio Access network (NG-RAN). The NG-RAN comprises gNodeBs (gNBs), providing the user plane and control plane (for example, RRC) protocol terminations towards the UE. The gNBs are interconnected with each other by means of an X2/Xn interface 126.

The gNBs are also connected by means of the N2 interface 128 to the Access and Mobility management Function (AMF).

In examples, the network 100 can comprise a combination of E-UTRAN and NG-RAN.

In examples, a terminal node 110 can be configured to perform and can perform dual active protocol stack handover from a first access node 120a, which can be considered a source node, to a second access node 120b, which can be considered a target node.

Some examples relate to a 3GPP network.

In examples a node, such as a terminal node 110, can determine positioning information from received wireless signals. However, in examples, depending on the environment between a transmitting node and the terminal node 110, the received wireless signals can comprise multipath signals.

Figure 2:
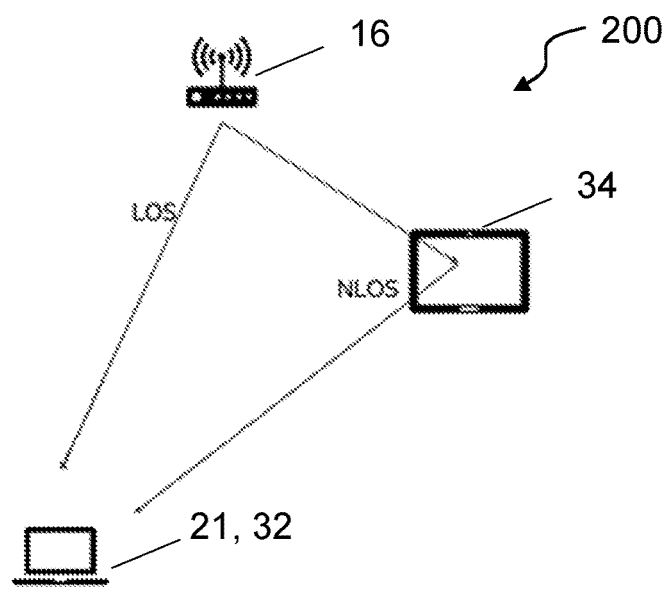
FIG. 2 shows another example of the subject matter described herein.

FIG. 2 illustrates an example of a network 200.

In the example of FIG. 2, the network 200 is a wireless network. In examples, the network 200 of FIG. 2 can form part of and/or can communicate with the network 100 of FIG. 1.

In the example of FIG. 2 a transmitter device 16 is wirelessly transmitting signals to an electronic device 32, which can be considered a receiver device 21.

In the example of FIG. 2 the network 200 can comprise any suitable type of network 200. In examples, the network can be considered a short range network. For example, the network 200 can have a range of up to 100 metres.

In the example of FIG. 2 the transmitter device 16 and receiver device 21 are any suitable Wi-Fi devices. In examples, the transmitter device 16 and receiver device 21 can be considered Wi-Fi stations (STA).

In the example of FIG. 2 there is an object 34 in the environment of the receiver device 21 and the signals from the transmitter device 16 take a line of sight (LOS) and non line of sight (NLOS) path to the receiver device.

Figure 3:
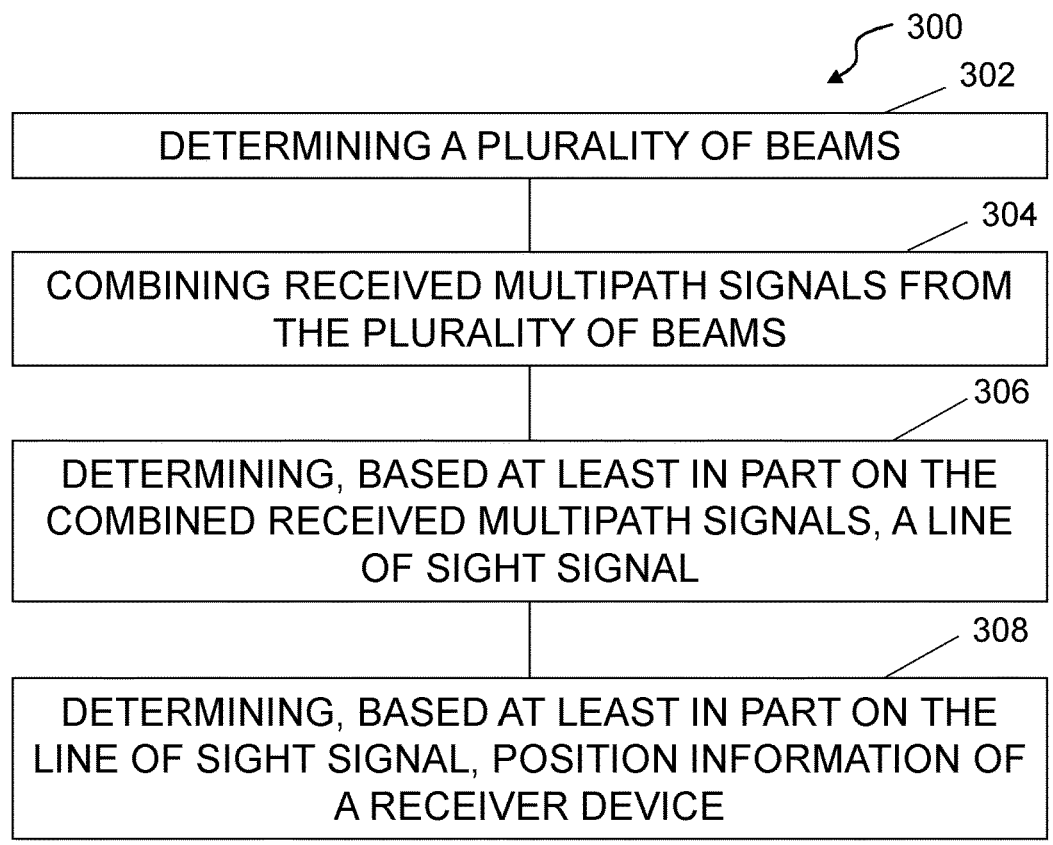
FIG. 3 shows another example of the subject matter described herein.

FIG. 3 illustrates an example of a method 300.

One or more of the features discussed in relation to FIG. 3 can be found in one or more of the other FIGS. During discussion of FIG. 3, reference will be made to other FIGS. for the purposes of explanation.

In examples, method 300 can be performed by any suitable apparatus comprising any suitable means for performing the method 300.

In examples, method 300 can be performed by any suitable node in network 100 and/or network 200. For example, method 300 can be performed by any suitable node in network 100 and/or network 200 that receives wireless signals and determines position information.

For example, method 300 can be performed by a terminal node 110 of FIG. 1 and/or receiver device 21 of FIG. 2.

In examples, method 300 can be considered a method 300 of determining position information 20.

In examples, method 300 can be considered a method 300 of reducing errors in determining position information 20.

In examples, method 300 can be considered a method 300 of mitigating ghost signals.

At block 302, method 300 comprises determining a plurality of beams 12.

In examples, determining a plurality of beams 12 can be performed in any suitable way using any suitable method. Any suitable number of beams 12 can be determined.

As used herein, the term "determining" (and grammatical variants thereof) can include, at least: calculating, computing, processing, deriving, investigating, looking up (for example, looking up in a table, a database or another data structure), and/or ascertaining. Also, "determining" can include receiving (for example, receiving information), and/or accessing (for example, accessing data in a memory). Also, "determining" can include resolving, selecting, choosing, and/or establishing.

In examples, the plurality of beams 12 can be considered a plurality of beamformers.

In examples, the plurality of beams 12 can be considered a plurality of reception beams 12 and/or reception beamformers.

In examples, a beam 12 can be considered to comprise any suitable information to be applied to signals received by a plurality of antenna elements. For example, a beam 12 can comprise a vector with complex entries that provide different weights to signals received by a plurality of antenna elements.

Accordingly, in examples, determining a plurality of beams comprises determining a plurality of vectors comprising complex entries that provide weights to signals received by a plurality of antenna elements.

In examples, determining a plurality of beams 12 comprises determining a plurality of adjacent beams 12.

Figure 4:
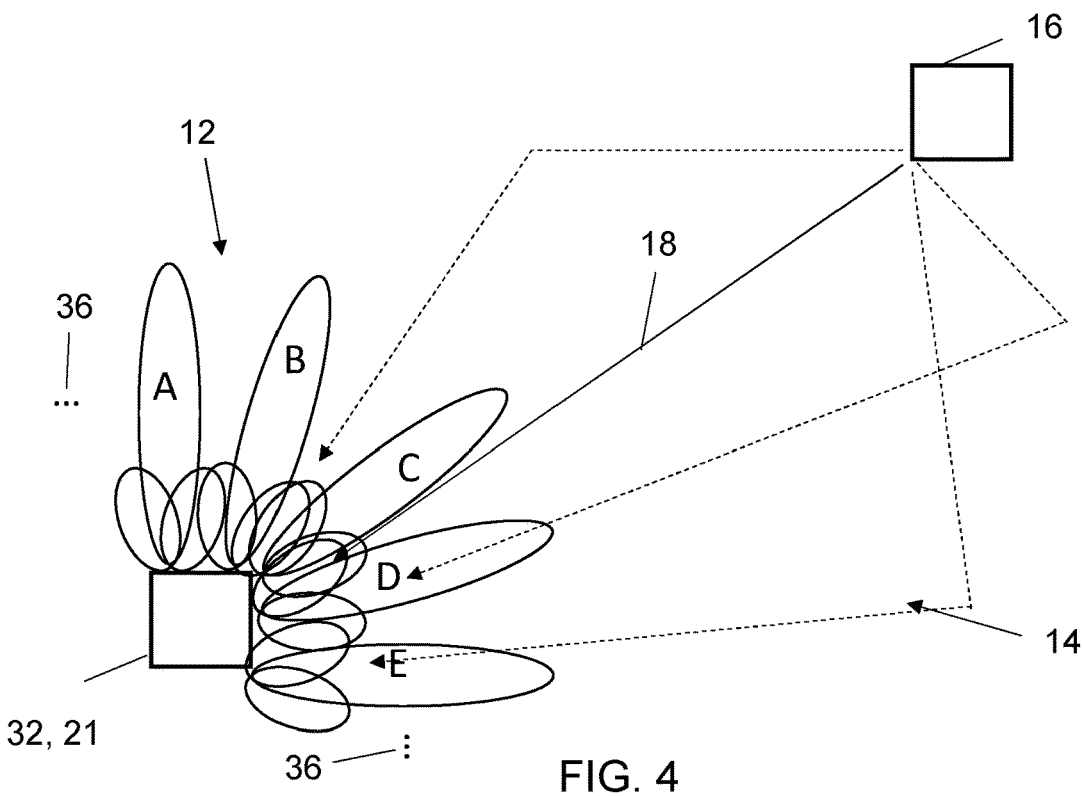
FIG. 4 shows another example of the subject matter described herein.

By way of example, reference is made to FIG. 4, which illustrates an example scenario.

In the example of FIG. 4, an electronic device 32, which can be considered a receiver device 21, has determined a plurality of beams 12, which can be considered reception beams 12. The beams 12 point in different directions.

In examples, the electronic device 32 can be considered an apparatus as described herein and/or an electronic device 32 comprising an apparatus as described herein.

Accordingly, FIG. 4 illustrates an electronic device 32 comprising an apparatus as described herein.

In the example of FIG. 4, the reception beams 12, formed by the determined signal weightings, are schematically illustrated and marked 'A' to 'E'. The main lobe and first sidelobes of the beams 12 'A' to 'E' are shown.

Although five beams 12 are shown in FIG. 4, in examples any suitable number of beams 12 can be determined. This is shown in the example of FIG. 4 by the ellipses 36 at either end of the set of illustrated beams 12.

In examples, the plurality of beams 12 determined at block 302 can be a subset of the total number of determined beams 12. For example, in FIG. 4 the beams 'A' to 'E' can be considered the plurality of beams 12, or the beams 'A' to 'C' can be considered the plurality of beams 12 or the beams 'B' and 'C' can be considered the plurality of beams 12 or any suitable combination thereof.

In the example of FIG. 4 a transmitter device 16 is transmitting signals to the receiver device 21.

In the illustrated example, the signals can take multiple paths from the transmitter device 16 to the receiver device 21 and can therefore be considered multipath signals 14.

In the illustrated example the line of sight (LOS) signal 18, which is direct between the transmitter device 16 and the receiver device 21, is indicated by a solid line and the non line of sight (NLOS) signals, which traverse, for example, via one or more reflections, are indicated by dashed lines.

In the example of FIG. 4 it can be seen that the LOS signal 18 is received by a sidelobe of beam 'C' and NLOS signals are received by the mainlobes of beams 'D' and 'E'.

This can cause problems, for example, for the receiver device 21 using the received signals to determine position information 20.

Referring back to FIG. 3, at block 304 method 300 comprises combining received multipath signals 14 from the plurality of the beams 12, the received multipath signals 14 generated by a transmitter device 16.

In examples, combining received multipath signals 14 from the plurality of beams 12 can be performed in any suitable way using any suitable method.

In examples combining received multipath signals 14 can be considered merging and/or superimposing and/or integrating multipath signals 14 and so on.

In examples, combining received multipath signals 14 comprises and/or can be considered combining multipath information received by and/or via the plurality of beams 12.

With reference to the example of FIG. 4, the multipath signals 14, including the LOS signal 18, received by the beams 12 of the receiver device 21 can be combined together.

That is, in the example of FIG. 4, information received by and/or via beams 'A' to 'E', or a subset thereof, can be combined together.

In examples, combining the received multipath signals 14 from the plurality of beams 12 comprises determining a superimposed channel response for the plurality of beams 12.

In examples, method 300 comprises mapping the superimposed channel to a received super-vector.

In examples, combining the received multipath signals 14 from the plurality of beams 12 comprises mapping the superimposed channel to a received super-vector.

The following provides an example method for combining the received multipath signals 14.

In examples, in combining received multipath signals 14, it is assumed that a transmitter device 16, which can be considered a positioning transmitter, is sending a known reference signal to a receiver device 21, which can be considered a positioning receiver, over a multipath propagation, such as an indoor multipath propagation. See, for example, the example of FIG. 4.

The receiver device 21 has Nr antennas/antenna elements and applies a beam/beamformer W indexed u, that is. $W_u \in C^{N_r}$ to capture the signal, where $C^{N_r}$ is the complex vector space of ordered Nr-tuples of complex numbers.

After analogue to digital conversion, the baseband signal for beam/beamformer u, at each observed carrier k can be given by:

$$y_u^{(k)} = W_u^H (h_u^{(k)} \cdot 1)s + n_u^{(k)}, \text{ with } h_u^{(k)} = \sum_{l=1}^{L_u} a_u(l) \exp(-2\pi j k d_u(l))$$ [Eqn 1]

where $h_u^{(k)}$ is the frequency response of a beamed channel consisting of $L_u$ multipath signals 14, each arriving with a delay $d_u(l)$ and gain $a_u(l)$, s and $n_u$ are the known Tx signal and the additive white gaussian noise respectively. 'H' used as a superscript denotes Hermitian operation.

U adjacent beams 12, which can be considered the plurality of beams 12, can be combined into a super-vector $y^{(k)T}$, as follows:

$$y^{(k)T} = \left[ y_{u-\frac{U}{2}-1}^{(k)T}, \ldots, y_{u+\frac{U}{2}}^{T} \right]$$ [Eqn 2]

Where 'T' denotes transpose. In examples, the number of beams 12 can be chosen such that the indices form whole numbers or a rounding function can be used on the indices.

In examples, the superimposed channel response $h^{(k)}$ can be determined/estimated and can be defined as follows:

$$h^{(k)} = h_{u,u-1,u+1,\ldots}^{(k)} = \sum_{l=1}^{L} a(l) \exp(-2\pi j k d(l)).$$ [Eqn 3]

Accordingly, in some examples, combining the received multipath signals 14 from the plurality of the beams 12 comprises determining a superimposed channel response for the plurality of beams 12. In examples, determining a superimposed channel response can be considered to form part of block 306.

In examples, the superimposed channel maps to the received super-vector via $y^{(k)}$, $$y^{(k)} = Wh^{(k)} + n, \text{ where } W = \left[ W_{u-\frac{U}{2}-1}^{H}, \ldots, W_{u+\frac{U}{2}}^{H} \right]^{H},$$ [Eqn 4]

and contains all the superimposition of the multipath signals 14 seen by the U adjacent beams/beamformers.

In examples, the matrix W in equation 4 can be considered a 'mapper' or a 'projection'.

Referring again to the example of FIG. 3, at block 306 method 300 comprises determining, based, at least in part, on the combined received multipath signals 14, a line of sight signal 18.

In examples, determining, based, at least in part, on the combined received multipath signals 14, a line of sight signal 18 can be performed in any suitable way using any suitable method.

In examples, determining, based, at least in part, on the combined received multipath signals 14, a line of sight signal 18 comprises determining a line of sight signal 18 from combined multipath information received by and/or via the plurality of beams 12.

With reference to the example of FIG. 4, the line of sight signal 18 is determined from the multipath signals 14 received by a plurality of beams 12 of the receiver device 21.

In examples, a line of sight signal 18 can be considered a signal that travels directly from a transmitter device 16 to a receiver device 21.

In examples, a line of sight signal 18 can be considered a signal that travels from a transmitter device 16 to a receiver device 21 without any redirections, such as reflections.

In examples, a line of sight signal 18 can be considered a direct path signal, a first signal and so on.

In examples, determining a line of sight signal 18 comprises assuming that delays 26 associated with the received multipath signals 14 are on a grid having a resolution 24.

Figure 5:
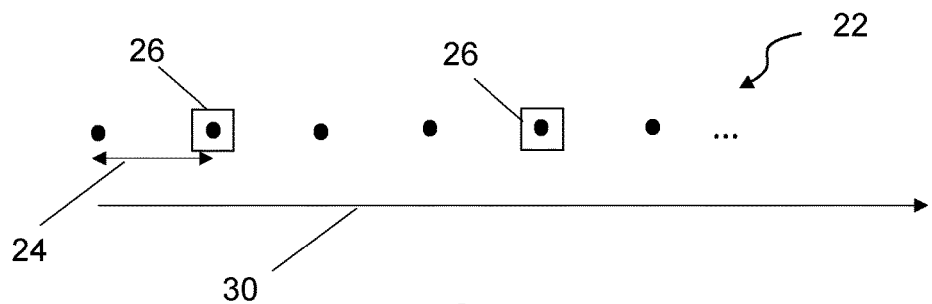
FIG. 5 shows another example of the subject matter described herein.

By way of example, reference is made to the example of FIG. 5.

FIG. 5 schematically illustrates a grid 22 of possible delays with a resolution 24. The resolution 24 can be considered to be the period and/or distance between two points on the grid 22. In the example of FIG. 5, time increases in the direction towards the right.

Any suitable resolution 24 can be used. In examples, the resolution 24 is less than the sampling time 30. This is illustrated in the example of FIG. 5 by the arrow, indicated as 30, pointing to the right of FIG. 5.

In the example of FIG. 5, two of the points of the grid 22 have squares around them. This indicates that these points of the grid 22 have delays 26 associated with received multipath signals 14.

Returning to FIG. 3, in examples, determining a line of sight signal 18 comprises determining a first received multipath signal 14 having energy above a threshold.

In examples, a first received multipath signal 14 can be considered a multipath signal 14 having the shortest associated delay.

In examples, the threshold can be considered a detection threshold, and any suitable threshold can be used. For example, the threshold can be defined as offset against the additive white gaussian noise of the superimposed channel, or empirically set, or selected based, at least in part, on the maximum multipath signal power, for example to be an amount below the maximum multipath signal power and so on.

In examples determining a line of sight signal 18 comprises employing and/or using a non line of sight channel detector. Any suitable non line of sight channel detector can be used.

The following provides an example method for determining, based at least in part on the combined received multipath signals 14, a line of sight signal 18.

To determine a line of sight signal 18, $h^{(k)}$ (see [Eqn 3] and [Eqn 4] can be determined/estimated by applying the gains and delay observed at each of the plurality of U beams into the superimposed beam, that is $a=[a(1), \ldots, a(L)]$ and $d=[d(1), \ldots, d(L)]$ in [Eqn 3].

In examples, it is assumed that the delays can be approximated as lying on a grid with very fine resolution (that is ds<<Ts, where ds is the resolution and Ts is the sampling time of the system).

In some examples the grid length L is not longer than the symbol duration T, that is L=T/ds. However, in examples, the grid can have any suitable length.

Without loss of generality, it is assumed that delay d(l) =l·ds. That is, in examples, it is assumed that the delay of the l-th component d(l) is an integer multiple of the resolution ds.

For example, with regard to FIG. 5, it is assumed that the delays 26 indicated by the squares are integer values of possible delay values of the grid 22.

Then, if the delay does not correspond or is not close to/is not in the neighborhood to a true channel multipath signal 14, the gain a(I) will be determined/estimated as 0. This simplification reduces the channel reconstruction task to that of determining/estimating the complex entries of the vector a.

In examples, this can be performed using any suitable method. For example, this can be achieved with existing greedy approaches such as orthogonal matching pursuit-based algorithms. In examples, other approaches, such as Bayesian learning, can also be applied.

The line of sight signal 18 can then be determined.

In examples, the line of sight signal 18 is typically the first arriving multipath signal 14, that is the first received multipath signal 14 with relevant energy, for example, x=min{1, ..., L}, for which |a(x)|>Γ, where Γ is the detection threshold. In examples, the detection threshold can be defined as offset against the AWGN n of the superimposed channel, or empirically set, or selected as the maximum tap power, or to be y dBs below maximum multipath signal power and so on.

In examples, line of sight signal 18 is not present in the channel associated with each beamformer u, which means that the beamformer/channel comprises only non line of sight signals and therefore can be marked as NLOS.

Accordingly, in examples, prior to determination of line of sight signal 18, a NLOS channel detector may be employed. Any suitable NLOS detector can be used. For example a NLOS detector that makes use of the previous estimate a and computes a LOS probability or binary indicator, a NLOS detector that relies on hypothesis testing, and/or a NLOS detector that employs machine learning classifier such as decision forests.

In such examples, if the channel is deemed by the detector as LOS, then the line of sight signal determination follows.

In some examples, method 300 comprises determining relevant reflected multipath signals.

In examples, a multipath signal 14 can be considered relevant if the power of the multipath signal 14 is above a threshold. Any suitable threshold can be used. For example, the threshold can be determined based, at least in part, on the Rx noise floor, can be determined based, at least in part, on the maximum multipath signal power and so on.

At block 308, method 300 comprises determining, based at least in part, on the line of sight signal 18, position information 20 of a receiver device 21.

Consequently, FIG. 3 illustrates a method 300 comprising:
  determining a plurality of beams 12;
  combining received multipath signals 14 from the plurality of beams 12, the received multipath signals 14 generated by a transmitter device 16;
  determining, based at least in part on the combined received multipath signals, a line of sight signal 18; and
  determining, based at least in part on the line of sight signal, position information 20 of a receiver device 21.

In examples the receiver device 21 is the device that performs method 300.

In examples, determining, based at least in part of the line of sight signal 18, position information 20 of a receiver device can be performed in any suitable way using any suitable method.

In examples, position information 20 of a receiver device 21 can comprise any suitable information to allow an absolute or relative position and/or location of a receiver device to be determined. For example, position information 20 can comprise angle of arrival and time of arrival of the line of sight signal 18.

Accordingly, in examples, block 308 comprises determining, using any suitable method, angle of arrival and time of arrival of the line of sight signal 18.

In examples, the time and angle of the line of sight signal is returned as: x·ds and ∠(a(x)), respectively.

In examples, method 300 comprises determining a number of beams 12 from which the received multipath signals 14 are to be combined.

In examples, determining a plurality of beams 12 comprises determining a number of beams 12 from which the received multipath signals 14 are to be combined.

Determining a number of beams 12 from which the received multipath signals 14 are to be combined can be performed in any suitable way using any suitable method.

In examples, determining a number of beams 12 is based, at least in part, on one or more of: a beam width B, b of a main beam lobe and first side lobes, the channel spread S in the angle domain for multipath signals 14 above a power threshold, and the channel spread s in the angle domain for multipath signals 14 below the power threshold. In examples, s can be considered a 'tail spread'.

The beam width B, b of a main beam lobe and first side lobe can be considered the angular coverage of the main and first side lobes respectively. These are, in examples, antenna features and will be known be a receiver device 21.

The channel spread S in the angle domain can be considered to be the difference between the narrowest and widest relevant reflection in the angle domain from a transmitter device 16, a relevant reflection having power above a threshold.

The channel spread s in the angle domain can be considered to be the difference between the narrowest and widest reflection having power below the threshold.

In examples, an expected value for S and s can be determined from the channel models for which the method is being deployed, for example frequency-dependent indoor channel model.

In examples, method 300 comprises determining a sliding window size Z for determining how many beams 12 to skip for two consecutive beam bundles.

Accordingly, in examples, a number of adjacent beams 12 to be combined is determined and a number of beams to be skipped is determined.

Figure 8:
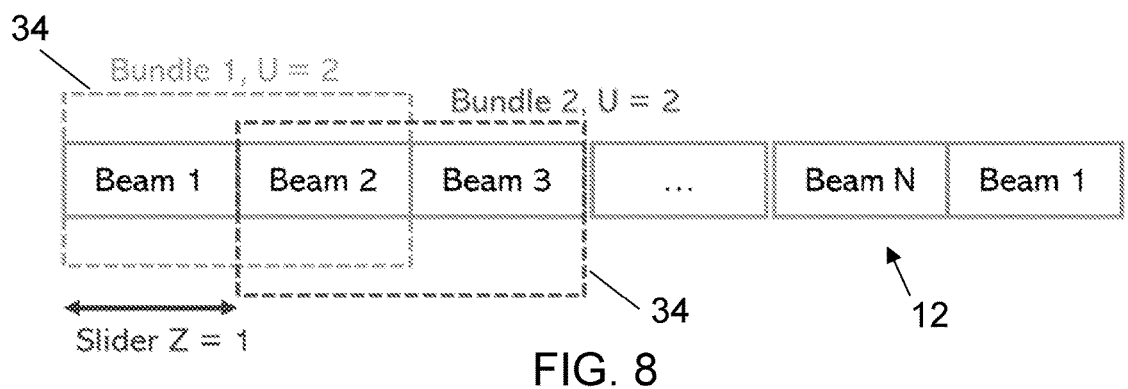
FIG. 8 shows another example of the subject matter described herein.

By way of example, reference is made to FIGS. 8 and 9.

FIG. 8 illustrates an example of beam groupings.

In the example of FIG. 8, N beams are illustrated and two different bundles 34 of 'U' beams indicated by the dotted boxes.

In the illustrated example a first bundle 34 of two beams (beams 1 and 2) are to be combined and a second bundle 34 of two beams (beams 2 and 3) are to be combined. The bundles are separated by one beam (Z=1).

FIG. 9 illustrates an example of determination of a number of beams 12 and bundle separator Z.

In the example of FIG. 9 f( ) denotes a generic function of multiple variables.

At blocks 904, 910 and 914 of FIG. 9 the known width of the first side lobe and the tail spread, s, is used to determine the slider Z. In the example of FIG. 9 the function used is Z=min(b,s).

At blocks 902, 908 and 906 of FIG. 9 the known width of the main lobe and the angular spread, S, is used to determine the number of beams 12, represented by 'U'. In the example of FIG. 9 the function used is U=ceil(S/B).

In FIG. 9 one or more channel modelling tools are used to determine S and s.

Examples of the disclosure are advantageous and provide technical benefits.

For example, examples of the disclosure allow a receiving device to mitigate the effect of non line of sight signals in determining position information.

Examples of the disclosure also provide a flexible approach in determining the line of sight signal, for example, the size of the grid, L, can be chosen based, at least in part, on the circumstances.

Figure 6:
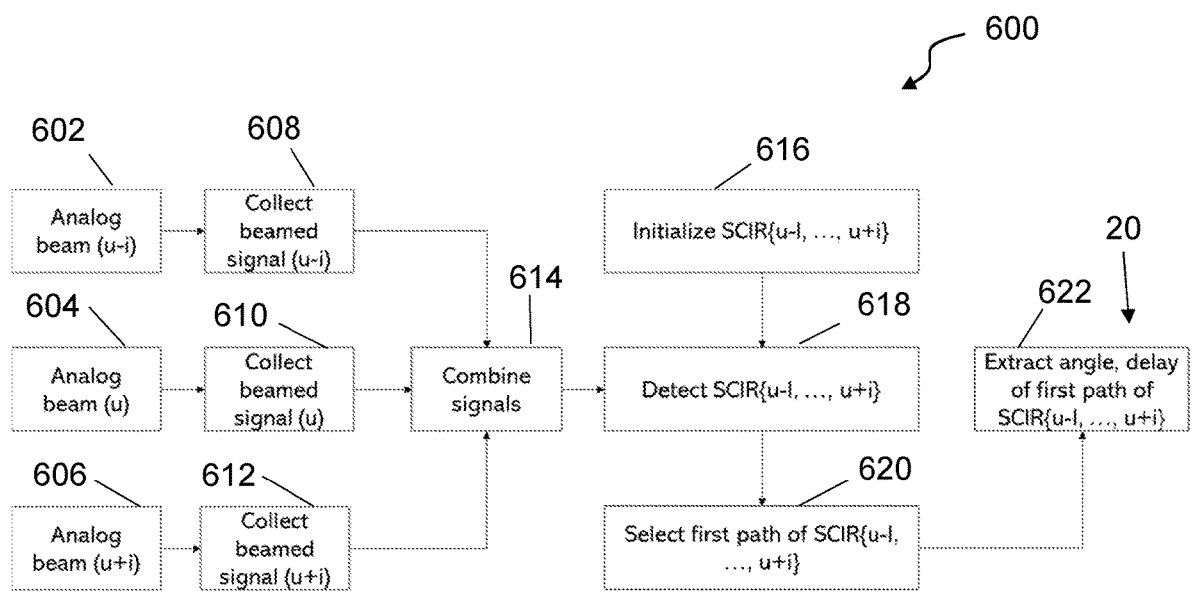
FIG. 6 shows another example of the subject matter described herein.

FIG. 6 illustrates an example of a method 600.

In examples, the method 600 can be performed by any suitable apparatus comprising any suitable means for performing the method 600.

In examples, method 600 can be performed by any suitable node in network 100 and/or network 200. For example, method 600 can be performed by any suitable node in network 100 and/or network 200 that receives wireless signals and determines position information.

For example, method 600 can be performed by a terminal node 110 of FIG. 1 and/or receiver device 21 of FIG. 2.

At blocks 602, 604 and 606 three beams 12 are determined, indicated as beam (u−1), beam (u) and beam (u+i).

At blocks 608, 610 and 612 multipath signals 14 are collected for the three beams, indicated as collect beamed signal (u−1), collect beamed signal (u) and collect beamed signal (u+i).

At block 614 the signals are combined and at block 616 the super-channel impulse response (SCIR(u−1, u, u+1) is initialized.

At block 618 the SCIR is detected and at block 620 the first path, or line of sight signal 18, of the SCIR is selected.

At block 622 position information 20 of the first path of the SCIR is extracted.

In summary, in the method 600, and/or in methods described herein, the channel impulse response (CIR) is estimated by combining the signals from at least three adjacent beams.

In other words, the received multipath signals as seen by any three (or more) adjacent beams are collected one super-channel impulse response (SCIR), corresponding to the superimposition of the three (or more) sparse channel responses associated with each of the beams, is estimated.

This prevents, for example, the receiver device 21 from misinterpreting the NLOS as LOS due to the beamforming gain of a sidelobe.

It can be considered that this approach corresponds to enhancing the main lobe (that is by combining the multiple narrow main lobes of the beamformers into a wider super-main lobe) and suppressing the sidelobes in the digital domain.

Once the SCIR is obtained, the angle and time of arrival of the first path of the SCIR are extracted and used for AOA- and/or TOA-based localization.

Figure 7:
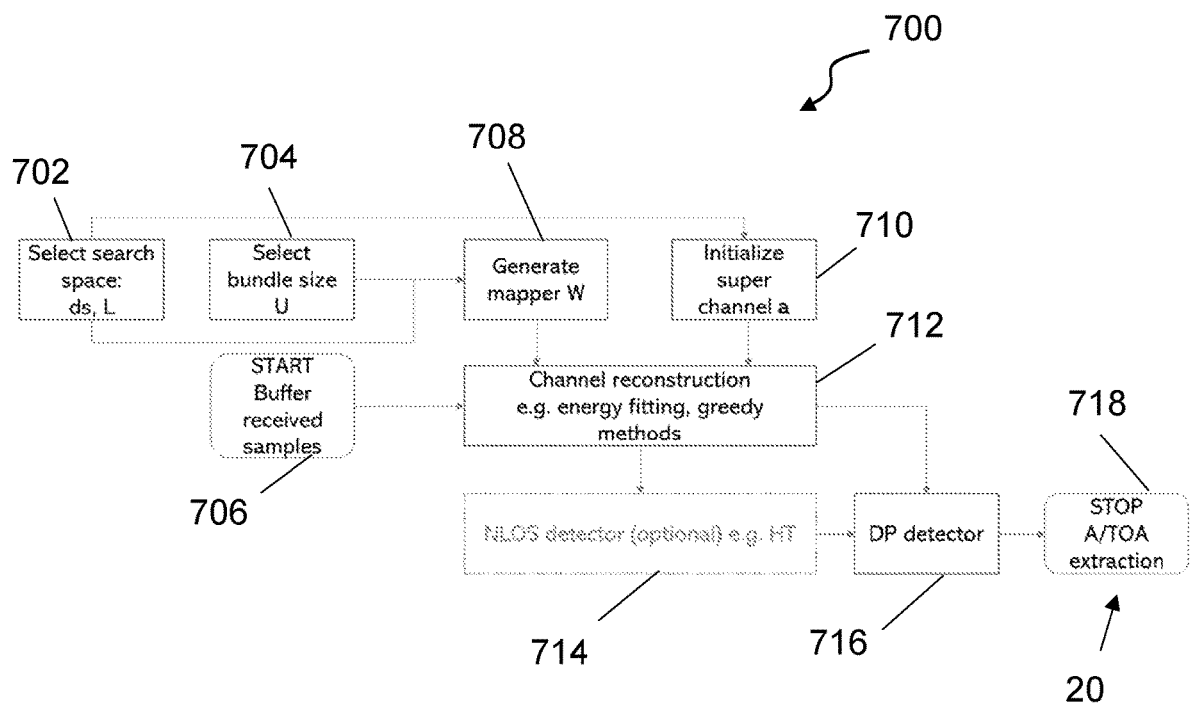
FIG. 7 shows another example of the subject matter described herein.

FIG. 7 illustrates an example of a method 700.

In examples, the method 700 can be performed by any suitable apparatus comprising any suitable means for performing the method 700.

In examples, method 700 can be performed by any suitable node in network 100 and/or network 200. For example, method 600 can be performed by any suitable node in network 100 and/or network 200 that receives wireless signals and determines position information.

For example, method 700 can be performed by a terminal node 110 of FIG. 1 and/or receiver device 21 of FIG. 2.

In examples, method 700 can be considered a method of determining, based at least in part on combined received multipath signals, a line of sight signal 18.

At block 702, the search space is selected. In the example of FIG. 7 the resolution, ds, and length, L, of the grid 22 is determined.

At block 704, the bundle size, U, of the plurality of beams 12 is selected and at block 708 mapper W is generated (see, for example, [Eqn 4]).

At block 706 received multipath signal samples are buffered and at block 710 super channel a is initialized.

Blocks 706, 708 and 710 feed into block 712 in which channel reconstruction method(s) are used and at block 714 a NLOS is optionally employed.

At block 716, a direct path, or line of sight signal 18, is detected and at block 718 position information 20 is extracted.

Examples of the disclosure provide technical benefits. For example, examples of the disclosure allow a receiver device to mitigate the effects of ghost signals during positioning.

Furthermore, examples of the disclosure provide a flexible method which can readily be adapted according to the circumstances. For example, the resolution ds and length L of the grid, and hence search space, can be flexibly changed according to circumstances.

Furthermore, examples of the disclosure can be used for channel equalisation for data decoding, for beam tracking, for beam selection in a subsequent uplink transmission and so on.

FIG. 10A illustrates an example of a controller 1130. The controller can be used in any suitable apparatus to perform at least part of one of more methods described herein. In examples the apparatus can be used in a terminal node 110, and/or an electronic device 32 and/or a receiver device 21 and/or a Wi-Fi device and/or a Wi-Fi station and so on.

In examples, controller 1130 can be considered an apparatus 1130.

Implementation of a controller 1130 may be as controller circuitry. The controller 1130 may be implemented in hardware alone, have certain aspects in software including firmware alone or can be a combination of hardware and software (including firmware).

As illustrated in FIG. 10A the controller 1130 may be implemented using instructions that enable hardware functionality, for example, by using executable instructions of a computer program 1136 in a general-purpose or special-purpose processor 1132 that may be stored on a computer readable storage medium (disk, memory etc.) to be executed by such a processor 1132.

The processor 1132 is configured to read from and write to the memory 1134. The processor 1132 may also comprise an output interface via which data and/or commands are output by the processor 1132 and an input interface via which data and/or commands are input to the processor 1132.

The memory 1134 stores a computer program 1136 comprising computer program instructions (computer program code) that controls the operation of the apparatus when loaded into the processor 1132. The computer program instructions, of the computer program 1136, provide the logic and routines that enables the apparatus to perform the methods illustrated in FIGS. 3 and/or 6 and/or 7 and/or 9. The processor 1132 by reading the memory 1134 is able to load and execute the computer program 1136.

The Apparatus Therefore Comprises:
   at least one processor 1132; and
   at least one memory 1134 including computer program code
   the at least one memory 1134 and the computer program code configured to, with the at least one processor 1132, cause the apparatus at least to perform:
   determining a plurality of beams;
   combining received multipath signals from the plurality of the beams, the received multipath signals generated by a transmitter device;
   determining, based at least in part on the combined received multipath signals, a line of sight signal; and
   determining, based at least in part on the line of sight signal, position information of a receiver device.

As illustrated in FIG. 10A, the computer program 1136 may arrive at the apparatus via any suitable delivery mechanism 1162. The delivery mechanism 1162 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1136. The delivery mechanism may be a signal configured to reliably transfer the computer program 1136. The apparatus may propagate or transmit the computer program 1136 as a computer data signal.

Computer program instructions for causing an apparatus to perform at least the following or for performing at least the following:
   determining a plurality of beams;
   combining received multipath signals from the plurality of the beams, the received multipath signals generated by a transmitter device;
   determining, based at least in part on the combined received multipath signals, a line of sight signal; and
   determining, based at least in part on the line of sight signal, position information of a receiver device.

The computer program instructions may be comprised in a computer program, a non-transitory computer readable medium, a computer program product, a machine readable medium. In some but not necessarily all examples, the computer program instructions may be distributed over more than one computer program.

Although the memory 1134 is illustrated as a single component/circuitry it may be implemented as one or more separate components/circuitry some or all of which may be integrated/removable and/or may provide permanent/semi-permanent/dynamic/cached storage.

In examples the memory 1134 comprises a random-access memory 1158 and a read only memory 1160. In examples the computer program 1136 can be stored in the read only memory 1158. See, for example, FIG. 10B

In some examples the memory 1134 can be split into random access memory 1158 and read only memory 1160.

Although the processor 1132 is illustrated as a single component/circuitry it may be implemented as one or more separate components/circuitry some or all of which may be integrated/removable. The processor 1132 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
   (a) hardware-only circuitry implementations (such as implementations in only analog and/or digital circuitry) and
   (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions and
   (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 3 and/or 6 and/or 9 may represent steps in a method and/or sections of code in the computer program 1136. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The apparatus can, in examples, comprise means for:
   determining a plurality of beams;
   combining received multipath signals from the plurality of the beams, the received multipath signals generated by a transmitter device;
   determining, based at least in part on the combined received multipath signals, a line of sight signal; and
   determining, based at least in part on the line of sight signal, position information of a receiver device.

In examples, an apparatus can comprise means for performing one or more methods, and/or at least part of one or more methods, as disclosed herein.

In examples, an apparatus can be configured to perform one or more methods, and/or at least part of one or more methods, as disclosed herein.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory storing instructions that, when executed by the at least one processor, cause the apparatus at least to perform:
   determining a plurality of beams;
   combining received multipath signals from the plurality of the beams, the received multipath signals generated by a transmitter device;
   determining, based at least in part on the combined received multipath signals, a line of sight signal by employing a non-line-of-sight channel detector; and
   determining, based at least in part on the line of sight signal, position information of a receiver device.

2. An apparatus as claimed in claim 1, wherein combining the received multipath signals from the plurality of the beams comprises determining a superimposed channel response for the plurality of beams.

3. An apparatus as claimed in claim 1, wherein determining the line of sight signal comprises assuming that delays associated with the received multipath signals are on a grid having a resolution.

4. An apparatus as claimed in claim 3, wherein the resolution is less than a sampling time.

5. An apparatus as claimed in claim 1, wherein determining the line of sight signal comprises determining a first received multipath signal having energy above a threshold.

6. An electronic device comprising the apparatus as claimed in claim 1 and a plurality of antennas.

7. An apparatus comprising:
   at least one processor; and
   at least one memory storing instructions that, when executed by the at least one processor, cause the apparatus at least to perform:
   determining a plurality of beams;
   determining a number of beams from which received multipath signals from the plurality of the beams are to be combined, wherein the received multipath signals are generated by a transmitter device;
   combining the received multipath signals based on the number of beams;
   determining, based at least in part on the combined received multipath signals, a line of sight signal; and
   determining, based at least in part on the line of sight signal, position information of a receiver device.

8. An apparatus as claimed in claim 7, wherein determining the number of beams is based, at least in part, on one or more of:
a beam width of a main beam lobe and first side lobes;
a channel spread in an angle domain for multipath signals above a power threshold; or
the channel spread in the angle domain for multipath signals below the power threshold.

9. An apparatus as claimed in claim 7, wherein combining the received multipath signals from the plurality of the beams comprises determining a superimposed channel response for the plurality of beams.

10. An apparatus as claimed in claim 7, wherein determining the line of sight signal comprises assuming that delays associated with the received multipath signals are on a grid having a resolution.

11. An apparatus as claimed in claim 7, wherein the resolution is less than a sampling time.

12. An apparatus as claimed in claim 7, wherein determining the line of sight signal comprises determining a first received multipath signal having energy above a threshold.

13. A non-transitory computer readable medium comprising program instructions stored thereon for causing an apparatus to perform:
determining a plurality of beams;
combining received multipath signals from the plurality of the beams, the received multipath signals generated by a transmitter device;
determining, based at least in part on the combined received multipath signals, a line of sight signal by employing a non-line-of-sight channel detector; and
determining, based at least in part on the line of sight signal, position information of a receiver device.

14. A non-transitory computer readable medium as claimed in claim 13, wherein combining the received multipath signals from the plurality of the beams comprises determining a superimposed channel response for the plurality of the beams.

15. A non-transitory computer readable medium as claimed in claim 13, wherein determining the line of sight signal comprises assuming that delays associated with the received multipath signals are on a grid having a resolution.

16. A non-transitory computer readable medium as claimed in claim 13, wherein the program instructions further cause the apparatus to determine a number of beams from which received multipath signals from the plurality of the beams are to be combined, and wherein determining the number of beams is based, at least in part, on one or more of:
a beam width of a main beam lobe and first side lobes;
a channel spread in an angle domain for multipath signals above a power threshold; or
the channel spread in the angle domain for multipath signals below the power threshold.

* * * * *